Patented June 2, 1942

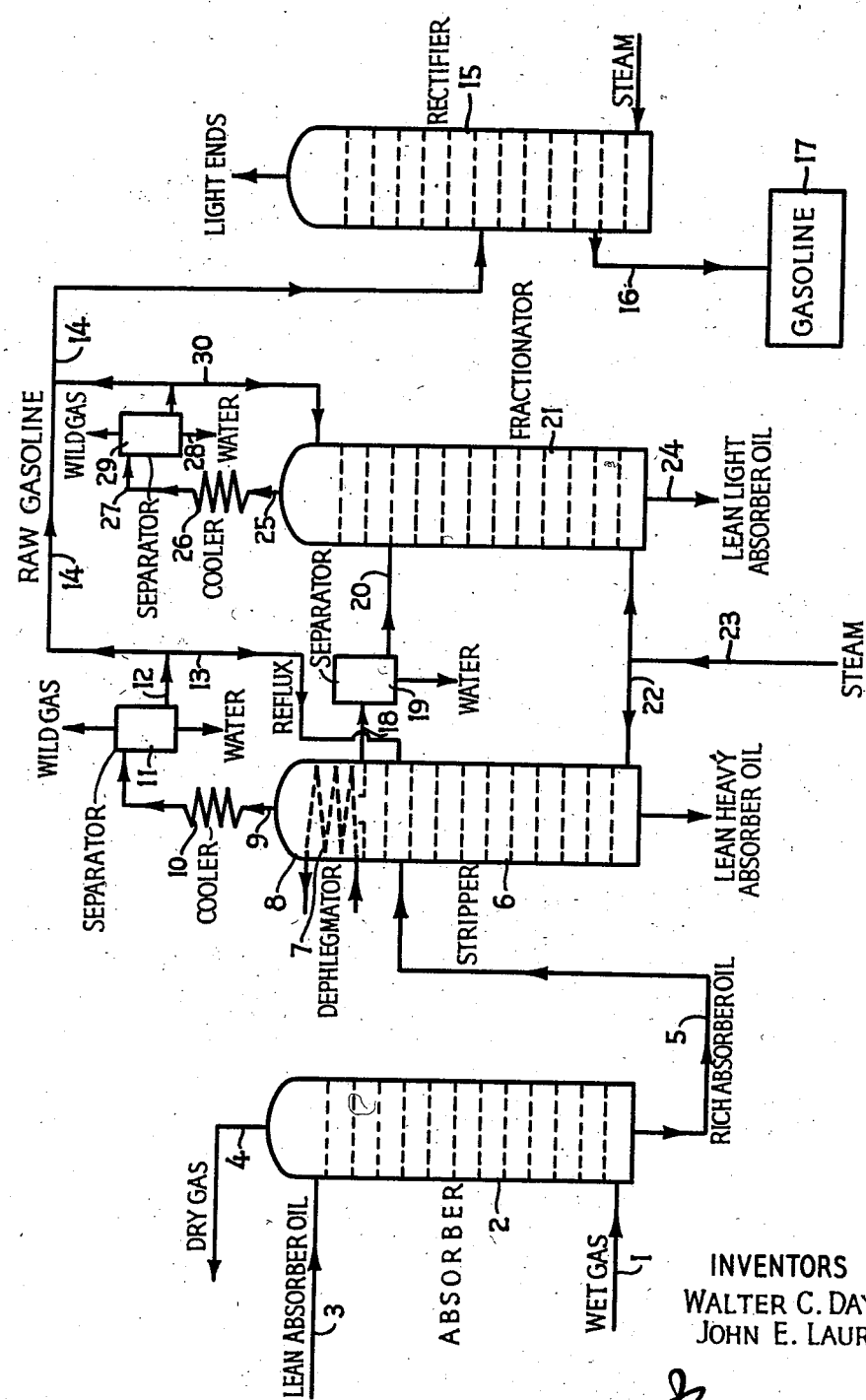

UNITED STATES PATENT OFFICE 2,284,973

2,284,973
RECOVERY OF GASOLINE FROM NATURAL GAS

Walter C. Dayhuff and John E. Laurance, Whittier, Calif., assignors to Standard Oil Company of California, San Francisco, Calif., a corporation of Delaware Application November 25, 1940, Serial No. 367,040

2 Claims. (Cl. 196—8)

This invention relates to a method of recovering gasoline from "wet" natural gas by absorption in a liquid absorption medium and has to do in particular with a close separation of said gasoline from the lighter fractions of said absorbing medium.

A "wet" natural gas is usually composed largely of methane, ethane, propane, which when separated may be used for fuel gases, and butane, normal and iso- pentane, hexane, heptane, octane, which largely comprise the natural gasoline fractions. The "wet gas," after being cooled and adjusted to the desired pressure, is absorbed in an absorbing menstruum usually composed of a hydrocarbon oil which acts as a sponge for the gasoline fractions of a "wet gas." This is accomplished by passing the "wet gas" to the bottom part of an absorber tower fitted with bubble-plates. The "wet gas" passes up the absorber tower counter-currently to the downward flow of the gasoline-free absorber oil, commonly referred to as "lean oil." The lean oil, in its passage down the absorber, preferentially absorbs the heavier portions of the natural gas and permits the unabsorbed or dry gas to pass from the top of the absorber tower in a form substantially ready for use for fuel. The absorber oil containing the heavier wet gas fractions, commonly referred to as "the rich oil," together with some of the lighter fractions which did not escape from the top of the absorber, is then heated and passed to a stripper for the purpose of removing the natural gasoline and other absorbed hydrocarbons and for regenerating the absorber oil for use in further absorption. Inasmuch as the absorber oil is specially prepared for the purpose for which it is used, it is necessary that the whole process be one which permits absorber oil to be returned substantially to its original state for further use as an absorbing medium.

It would be desirable for a stripping system in a natural gasoline extraction plant to be able to accomplish the following objectives without unreasonable operating costs:

1. Strip the absorber oil which has been enriched by absorbed wet natural gas to a vapor pressure of not more than 1.0 mm. of mercury at 80° F. This not only results in full recovery of absorbed gasoline from the absorber oil but, when the lean, stripped absorber oil is returned to the top of the absorber for further absorption, also results in preventing the escape of gasoline fractions along with the dry gas passing out of the absorber tower.

2. Reduce the absorber oil content of the separated gasoline product to at least 0.5% in order to avoid excessive losses of the lighter absorption oil fractions and to prevent deterioration of the absorber oil. When the rich oil from the absorber contains 10% gasoline fractions, in order to meet the above-mentioned objective a retention of 99.94% of the lean oil in the feed to the stripper is required.

3. Accomplish objectives 1 and 2 above while circulating an absorber oil of high absorptive capacity, that is, an absorber oil of high ratio of specific gravity to molecular weight. The higher such ratio is the lower will be the rate of absorber oil circulation required to obtain a given extraction of gasoline fractions absorbed in the absorber oil.

When objective 1 above, which is removal of all the gasoline fractions, is sought without regard to objectives 2 and 3, it may be obtained merely by adjusting the stripping steam rate. However, when objective 2, namely, prevention of loss of the light fractions of the absorber oil, is sought in connection with the removal of all gasoline fractions it becomes necessary to process the vapors from the stripper in order to remove those fractions of the absorber oil which have been vaporized in the stripping process. With reasonable refluxing rates and vaporizing loads, most stripping systems used in the industry can accomplish this only when the absorbing oil employed does not tend to vaporize readily. In such case, since the vapor pressure of the absorber oil is considerably lower than the maximum which could be used, an appreciable quantity of heavy gasoline fractions may be absorbed in the rich oil without raising the vapor pressure thereof above the 1.0 mm. limitation. Of course, a close cut between the lighter absorber oil and the heavier gasoline fractions is not realized.

Further difficulties are met in endeavoring to obtain objective 3, that is, employing an absorber oil of high absorptive capacity while stripping all the gasoline without loss of the absorber oil. When an absorption oil is lightened in weight to increase its absorptive capacity, the volatility of such absorption oil increases to such an extent that the required degree of separation of the lighter fractions of said absorber oil and the heavier fractions of the entrained gasoline can only be obtained in a highly efficient absorption and stripping system. When the absorption oil is lightened, the amount of the gasoline which may be included in the bottom product without raising the vapor pressure of the absorber oil above the maximum decreases rapidly and it becomes increasingly difficult to make the separation between the absorber oil and the entrained gasoline required for 99.94% retention of the absorber oil. As an extreme case it will be seen that if the body of the absorber oil is lightened to the extent that it approaches being a single component with a vapor pressure of its own of 1.0 mm. at 80° F., the amount of gasoline which may be included in the bottom product from the stripper tower becomes negligible if eventual separation is sought, and the reflux ratio required for 99.94% retention of the absorber oil would tend to be infinitely great.

The invention described and claimed herein is devised to accomplish simultaneously the three objectives stated above without incurring excessive operating costs.

In the usual stripping step the rich oil from the bottom of the absorber, after being heated, is passed to the middle of the stripper. The rich oil flows downward through the bubble plates of the stripper counter-currently to the ascending steam admitted at the bottom of the stripper. The steam and the stripped vapors pass out of the stripper and the stripped oil is removed from the bottom of the stripper. The vapors, which are comprised mainly of gasoline fractions, both light and heavy, together with steam, wild gases and a certain amount of the absorber oil which has been evaporated, pass then to a dephlegmator where all but the wild gases are condensed. Water is removed and part of the remainder of the condensate, including most of the light absorber oil fractions, is refluxed to the stripper. Commonly, the dephlegmator is in the upper part of the tower containing the stripper. Such single stage process is subject to the following objections:

(1) Where a well fractionated product is desired, it is always necessary to establish the reflux ratio with respect to the volume of material leaving the bottom of the column. However, in a single stage system as described above the volume of absorption oil passing downward through the stripping section is so large in proportion to the volume of the gasoline fractions distilled overhead that it becomes impractical to maintain reflux delivery rates high enough to give even a moderate reflux ratio with respect to the bottom product. In the average low pressure gasoline extraction plant the total lean absorber oil stream passing downward through the stripper is 20 times greater than the volume of gasoline fractions passing counter-currently upward through the descending lean oil.

(2) The large volume of stripping steam originating at the bottom of the stripper but which actually passes on to the dephlegmator, tends to reduce the effective reflux ratio both by its action as a fixed gas and by its tendency to condense on the upper trays of the stripping tower in such a manner that the heat liberated vaporizes a considerable portion of the dephlegmator reflux before the dephlegmator reflux can descend to the lower trays.

(3) Further, the amount of heavy gasoline fractions extracted from the enriched oil and the amount of light absorber oil fractions which it is desired to separate from the heavy gasoline fractions are so small compared with the amount of lighter gasoline and heavy absorber oil present that it becomes impractical to attempt a close separation in the usual single stage system, in the presence of such a heavy traffic of other materials, that is, of the heavy absorber oil fractions and the larger volume of lighter gasoline fractions.

Various methods have been suggested for overcoming the difficulties described above. Among such methods is the procedure whereby the dephlegmation and fractionation steps are conducted in separate units. Under this system the charge to the stripper is overstripped. This results in removing from the stripper not only all of the light gasoline fractions but all the heavy gasoline fractions and, unavoidably, certain light fractions of the absorber oil. The light and heavy gasoline fractions and the light absorber oil fractions pass to the dephlegmator. All of the dephlegmator condensate is delivered to a fractionating column where separation is made between the large volume of gasoline fractions and the relatively small volume of the light absorber oil fractions which were vaporized in the stripper. This method has the advantage that in the fractionating column the heavy traffic of the main body of the absorber oil is eliminated and separation is required only between the gasoline fractions, both light and heavy, and the light fractions of the absorber oil which were carried over due to the overstripping. Such method, while being an improvement over the single stage method, described above, is subject to a number of objections among which are:

1. The gasoline fractions in the stripper vapors are condensed in the dephlegmator, are revaporized in the fractionating column, are refluxed to the fractionating column, and then condensed again prior to passage to the final rectifier. Such total handling of the whole gasoline stream results in unnecessary operating expense.

2. While the above-described method eliminates the excessive traffic of the unvaporized absorber oil while attempting to separate the heavy gasoline fractions from the light absorber oil fractions, there is still involved in the fractionating column a heavy traffic of the total gasoline fractions compared to the small amount of light absorber oil contained in the fractionating column. The steam and the fixed gases in the fractionator are detrimental to the separation of such small volume of light absorber oil fractions contained therein.

3. In order to facilitate condensation of the overhead product from the fractionator, the fractionator must be operated at relatively high pressure in the order of nearly twice the stripper pressure. As a result of such high pressure operations the light absorber oil withdrawn from the bottom of the fractionator tends to have an undesirably high vapor pressure unless large amounts of stripping steam are injected into the fractionator.

Applicants' invention described herein is an improvement over both of the methods described above. In applicants' process the charges to the stripper are overstripped and the vapors from the stripper, including both heavy and light gasoline fractions together with certain light absorber oil fractions, are subjected to partial condensation accomplished by the dephlegmator. A large portion of such vapors passing to the zone of partial condensation are uncondensed. The uncondensed vapors consist solely of gasoline vapors and include substantially all of the lighter gasoline fractions. These vapors are then separately cooled and condensed, intrained water and light ends are removed, and the raw gasoline passed to the rectifier. In the zone of partial condensation above referred to, the heavier gasoline fractions and the light absorber oil are condensed and, instead of being returned to the stripper as in the single stage procedure, are passed to a fractionating column. It will be seen that there pass to the fractionating column all of the absorber oil which was evaporated from the stripper and a minimum quantity of the heavier gasoline fractions which did not escape from the zone of partial condensation as vapors. Unlike the two-stage process described above, the main body of the gasoline does not pass to this fractionator. In this manner the main traffic of oil and gasoline is avoided and there is involved in the fractionator only the separation of said light absorber oil and the heavier gasoline fractions. Such separation can be accomplished without difficulty in an efficient fractionating column which has only to handle the two fractions. An additional advantage is the fact that the overhead product from such fractionator is readily condensible, with the result that it is practicable to operate the fractionating column at the low pressures favorable to the process.

In the accompanying drawing, the wet gas, containing natural gasoline and fuel gases, passes through line 1 into the absorber 2 and upward, counter-currently to the descending lean absorber oil which has entered the absorber through line 3. The highly volatile fuel gas not absorbed by the descending absorber oil emerges through line 4 at the upper part of the absorber. The absorber oil which in its descent in the absorber tower has become enriched by absorption of the gasoline fraction of the wet gas as well as some of the gases, passes through line 5 to the upper part of the stripper 6.

In the stripper 6, the enriched absorber oil flows downward counter-currently to ascending steam admitted to the bottom of the stripper through line 22. The temperature of the stripper is such that all the entrained gases, the natural gasoline, and a part of the light ends of the absorber oil are vaporized. The temperature maintained in the dephlegmator, which in the exemplification here given is encased in the same tower containing the stripper, is such that substantially all of the gasoline fractions, except the heavy gasoline fractions and the vaporized light absorber oil, remain in vapor form and pass through line 9 to cooler 10 where they are condensed. From the cooler, the condensed gasoline fractions pass to separator 11, where the condensed steam and any uncondensed wild gas is removed. From the separator 11, the condensed gasoline passes through lines 12 and 14 to rectifier 15 and thence for further treatment or storage. A portion of the product leaving the separator 11 will be refluxed through line 13 to the dephlegmator 7, for cooling purposes and to insure separation of any entrained light absorber oil fractions.

As has been previously stated, the temperature maintained in the dephlegmator is such that substantially all of the light absorber oil which has been evaporated in the stripper by reason of the over-stripping therein, together with a minimum amount of the heavy gasoline fraction, is condensed, the remainder of the gasoline fraction having passed overhead in vapor form. Such condensate from the dephlegmator, instead of being refluxed is passed through line 18 to separator 19, where any condensed steam is removed. From separator 19 the heavy gasoline fractions and the light absorber oil pass through line 20 to fractionator 21. In the fractionator the heavy gasoline and the light absorber oil are separated. As the charge to the fractionator starts to flow downward it is met by steam which has been admitted to the fractionator bottom through lines 23 and 22. The descending charge is stripped of its gasoline content which passes overhead in vapor form. The thoroughly stripped light absorber oil emerges from the bottom of the fractionator 21 through line 24, whence it may be returned to the absorber for further absorption of wet gas. The overhead from fractionator 21, which consists substantially of the heavy gasoline fractions, passes to cooler 26 through line 25 and thence through line 27 to separator 29. In separator 29 water is removed through line 28 and any entrained wild gases emitted at the top of the separator. A portion of the gasoline withdrawn from the separator is refluxed to fractionator 21 through line 30 and the remainder of the gasoline from the separator passes through line 14 to rectifier 15 and thence through line 16 to gasoline storage.

The accompanying drawing has been simplified for purpose of clarification. Accumulators, vent tanks and other items of equipment conventionally included in natural gasoline plants have been omitted. Likewise, there have been omitted valves, pumps, compressors, heat exchangers, and other similar items which all those skilled in the art would know how and where to place.

Applicants' invention is not to be deemed limited by this specific procedure and apparatus described and shown in the accompanying drawing. Various modifications may be made and only such limitations are to be imposed as come within the proper interpretation of the appended claims.

We claim:

1. The method of recovering gasoline constituents from natural gas containing such constituents as well as substantial proportions of lower boiling point hydrocarbons, comprising passing said natural gas to a liquid absorption medium, absorbing gasoline constituents contained in said natural gas in said absorption medium, treating said absorption medium to cause the vaporization of substantially all of said gasoline constituents absorbed therein as well as some of the lighter fractions of said absorption medium, passing said vapors to a zone of partial condensation wherein said vaporized portions of said absorption medium and a minimum amount of the heavier of said vaporized gasoline fractions are condensed, the uncondensed gasoline constituents being passed overhead and separately recovered, treating said condensed absorption oil and heavier gasoline fractions, apart from the main body of said absorption medium and gasoline constituents, in order to separate said condensed absorption medium and said heavier gasoline fractions.

2. In a process of recovering gasoline constituents from a gaseous hydrocarbon mixture containing such constituents as well as substantial proportions of lower boiling point hydrocarbons by absorbing the gasoline hydrocarbons in a liquid absorption medium from which the gasoline constituents are subsequently recovered, the improvement which comprises passing the rich absorption oil from the absorption step to a stripping zone wherein a substantial part of said gasoline hydrocarbons and some of the lighter portions of said liquid absorption medium are removed both in vapor form, passing said vapors to a zone of partial condensation wherein substantially all of said absorption medium vapors and only a minimum amount of said gasoline hydrocarbon vapors are condensed, separately fractionating such condensate in order to separate said gasoline hydrocarbons and said overhead absorption medium, said separation being effected apart from the main body of the absorption oil and the main body of the gasoline hydrocarbons.

WALTER C. DAYHUFF.
JOHN E. LAURANCE.